United States Patent
Hofstee et al.

(10) Patent No.: US 6,751,749 B2
(45) Date of Patent: Jun. 15, 2004

(54) METHOD AND APPARATUS FOR COMPUTER SYSTEM RELIABILITY

(75) Inventors: Harm Peter Hofstee, Austin, TX (US); Ravi Nair, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 09/791,143

(22) Filed: Feb. 22, 2001

(65) Prior Publication Data

US 2002/0116662 A1 Aug. 22, 2002

(51) Int. Cl.$^7$ ................................................. G06F 11/16
(52) U.S. Cl. ........................... 714/11; 712/32; 712/228; 714/12; 714/15
(58) Field of Search ...................... 712/32, 228; 714/11, 714/12, 15

(56) References Cited

U.S. PATENT DOCUMENTS

| | | | | |
|---|---|---|---|---|
| 3,810,119 A | * | 5/1974 | Zieve et al. ................. | 709/400 |
| 5,504,859 A | | 4/1996 | Gustafson et al. ............. | 714/11 |
| 5,568,380 A | * | 10/1996 | Brodnax et al. .............. | 700/79 |
| 5,586,278 A | | 12/1996 | Papworth et al. ............ | 712/235 |
| 5,625,789 A | | 4/1997 | Hesson et al. .............. | 712/217 |
| 5,794,024 A | | 8/1998 | Golla et al. ................. | 712/228 |
| 5,860,014 A | | 1/1999 | Cheong et al. ............. | 710/260 |
| 5,870,582 A | | 2/1999 | Cheong et al. ............. | 712/218 |
| 5,915,110 A | | 6/1999 | Witt et al. ................... | 712/239 |
| 6,058,491 A | * | 5/2000 | Bossen et al. ................ | 714/15 |
| 6,571,363 B1 | * | 5/2003 | Steiss ......................... | 714/732 |
| 2002/0073357 A1 | * | 6/2002 | Dhong et al. ................. | 714/19 |

OTHER PUBLICATIONS

Smith et al., "Implementing Precise Interrupts in Pipelined Processors," Proceedings of the 12th Annual Symposium on Computer Architecture, pp. 36–44, Jun. 1985 (as reprinted in "Readings in Computer Architecture," pp. 202–213, Mark D. Hill et al. ed., Morgan Kaufmann publ., San Frn. CA 2000).

Northrop et al, "MP 5.2 600MHz G5 S/390 Microprocessor," 1999 IEEE International Solid State Circuits Conference, pp. 88–89.

* cited by examiner

Primary Examiner—Kenneth S Kim
(74) Attorney, Agent, or Firm—Anthony V.S. England; Casimer K. Salys (57) ABSTRACT

According to one embodiment, a multiprocessing system includes a first processor, a second processor, and compare logic. The first processor is operable to compute first results responsive to instructions, the second processor is operable to compute second results responsive to the instructions, and the compare logic is operable to check at checkpoints for matching of the results. Each of the processors has a first register for storing one of the processor's results, and the register has a stack of shadow registers. The processor is operable to shift a current one of the processor's results from the first register into the top shadow register, so that an earlier one of the processor's results can be restored from one of the shadow registers to the first register responsive to the compare logic determining that the first and second results mismatch. It is advantageous that the shadow register stack is closely coupled to its corresponding register, which provides for fast restoration of results. In a further aspect of an embodiment, each processor has a signature generator and a signature storage unit. The signature generator and storage units are operable to cooperatively compute a cumulative signature for a sequence of the processor's results, and the processor is operable to store the cumulative signature in the signature storage unit pending the match or mismatch determination by the compare logic. The checking for matching of the results includes the compare logic comparing the cumulative signatures of each respective processor. It is faster, and therefore advantageous, to check respective cumulative signatures at intervals rather than to check each individual result.

18 Claims, 7 Drawing Sheets

METHOD AND APPARATUS FOR COMPUTER SYSTEM RELIABILITY

CROSS-REFERENCE TO RELATED APPLICATION

This patent application is related to co-pending application "MULTIPROCESSOR WITH PAIR-WISE HIGH RELIABILITY MODE, AND METHOD THEREFORE," Ser. No. 09/734,117 which is assigned to the same assignee and is hereby incorporated herein by reference.

BACKGROUND OF THE INVENTION

1. Field of the Invention

The present invention relates to high reliability processing, by hardware redundancy. More particularly, the invention relates to a processing system with pair-wise processors that operate in a high reliability mode to detect computational errors, and operate independently in a high performance mode.

2. Related Art

Figure 1:
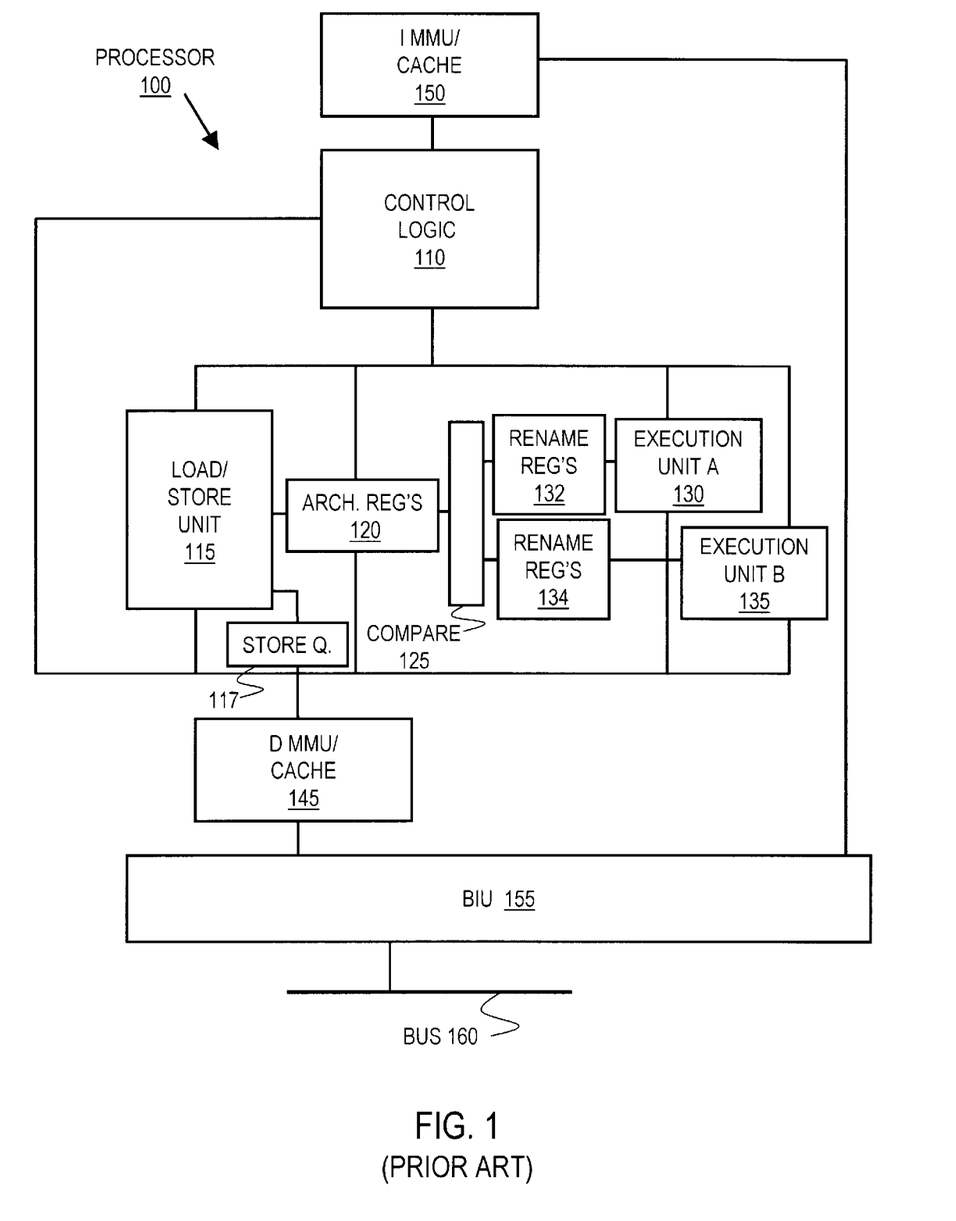
FIG. 1 illustrates a prior art processor for high reliability processing.

Various approaches exist for achieving high reliability processing. FIG. 1 illustrates one prior art processor 100 for high reliability processing. The processor 100 includes two execution units 130 and 135, which are both the same type of arithmetic unit. For example, the two execution units could both be floating point units, or integer units. The processor 100 has architected registers 120 for holding committed execution results. The two execution units 130 and 135 both execute the same instruction stream in parallel. That is, for each instruction an instance of the instruction executes in each respective execution unit 130 and 135. Then, when the two units are ready to commit the result for an instruction to the register file 120, the two versions of the result are compared by compare unit 125. If the compare unit 125 determines that the versions are the same, then the unit 125 updates one or more of the registers 120 with the result. If the versions do not match, then other actions are taken. In one implementation, a counter records whether an error is occurring repeatedly, and if it is, the error is classified as a "hard" failure. In the case of a hard failure, the instruction issue mechanism does not reissue the faulting instruction, but instead executes a "trap" instruction. One such trap leads to a micro code routine for reading out the state of the defective processor and loading it into a spare processor, which restarts execution at the instruction that originally faulted. In an alternative, where no spare processor is available, the trap leads to the operating system migrating the processes on the faulty processor to other processors, which adds to the workload of the other processors.

While this arrangement provides a reliability advantage, it is disadvantageous in that the processor design is more complex than a conventional processor and has greater overhead. Moreover, it limits the processor 100 throughput to have two execution units 130 in the processor 100 both executing the same instruction stream. Another variation of a processor which is designed for exclusively high reliability operation is shown in Richard N. Gufstason, John S. Liptay, and Charles F. Webb, "Data Processor with Enhanced Error Recovery," U.S. Pat. No. 5,504,859, issued Apr. 2, 1996.

Figure 2:
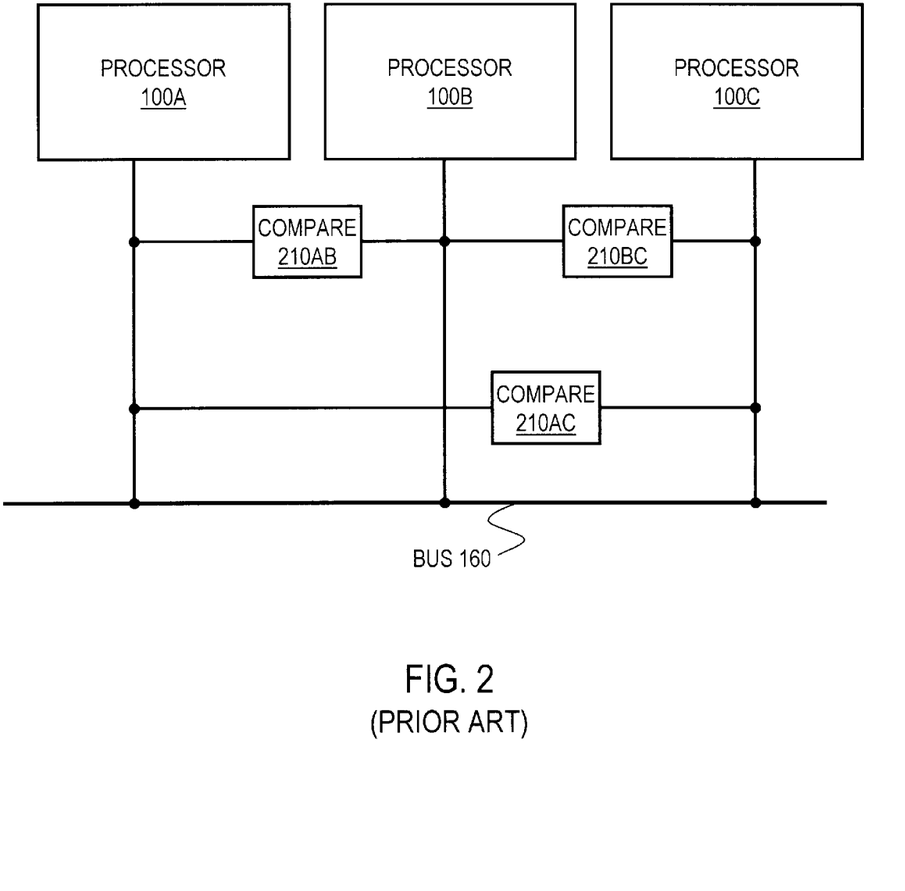
FIG. 2 illustrates another prior art system for high reliability processing.

FIG. 2 illustrates another arrangement for high reliability processing. In this voting arrangement, three processors 200 each execute the same program in parallel and versions of a result are compared at checkpoints in the program on a bus 160 external to the processors 100. If the versions do not match, then other actions are taken, such as substituting a different processor 100 for the one that produced the disparate version. This arrangement is advantageous in that complexity of the individual processors 200 is reduced, and an error producing processor can be identified. Also, the throughput of one of the processors 200 may be greater than that of the one processor 100 in FIG. 1, since the individual processor 200 does not devote any of its execution units to redundant processing. However, the arrangement of FIG. 2 is redundant at the level of the processors 200, and uses three whole processors 200 to recover from a single fault. Also, the error checking is limited to results which are asserted externally by the processors.

In the related application, a pair of processors use state-of-the-art state recovery mechanisms that are already available for recovering from exceptions and apply these mechanisms to operate in lockstep synchrony in a high reliability mode. This is highly advantageous because it achieves the high reliability without extensive modification to existing processor design. However, it is somewhat limiting because of the required synchrony. That is, in the high reliability mode the processors in the related application must process a stream of instructions in the same sequence.

From the foregoing, it may be seen that a need exists for improvements in high reliability processing.

SUMMARY

The foregoing need is addressed in the present invention. According to the invention, in a first embodiment, a multiprocessing system includes a first processor, a second processor, and compare logic. The first processor is operable to compute first results responsive to instructions, the second processor is operable to compute second results responsive to the instructions, and the compare logic is operable to check at checkpoints for matching of the results. Each of the processors has a first register for storing one of the processor's results, and the register has a stack of shadow registers. The processor is operable to shift a current one of the processor's results from the first register into the top shadow register, so that an earlier one of the processor's results can be restored from one of the shadow registers to the first register responsive to the compare logic determining that the first and second results mismatch. It is advantageous that the shadow register stack is closely coupled to its corresponding register, which provides for fast restoration of results.

In a further aspect of an embodiment, each processor has a signature generator and a signature storage unit. The signature generator and storage unit are operable to cooperatively compute a cumulative signature for a sequence of the processor's results, and the processor is operable to store the cumulative signature in the signature storage unit pending the match or mismatch determination by the compare logic. The checking for matching of the results includes the compare logic comparing the cumulative signatures of each respective processor. It is faster, and therefore advantageous, to check respective cumulative signatures at intervals rather than to check each individual result.

Also, in one embodiment, the instructions have a certain instruction sequence and at least one of the processors may execute instructions in a sequence different than the program sequence, but both of the processors execute store-type instructions according to a sequence in which the store-type instructions occur in the certain instruction sequence. The checkpoints are responsive to store instructions, so that a first sequence of results for the first processor ends at one of the checkpoints with a result for one of the store instructions and a second sequence of results ends at the checkpoint for the second processor with a result for the same one of the store instructions. It is advantageous to trigger checkpoints responsive to store-type instructions so that while an intermediate one of the results of the first sequence of results may be different than a corresponding intermediate one of the results of the second sequence of results, nevertheless the first processor's ending result for the first sequence and the second processor's ending result for the second sequence tend to match unless one of the processors has malfunctioned.

In an alternative embodiment, the second processor executes the instructions in a sequence identical to a sequence in which the first processor executes the instructions, and the checkpoints are responsive to accumulated number of execution cycles. In this embodiment the checkpoints may also be responsive to store instructions. In one such embodiment, the checkpoints are responsive to store instructions and accumulated number of execution cycles if there has been no store instruction since a last checkpoint.

While the invention is susceptible to various modifications and alternative forms, specific embodiments thereof are shown by way of example in the drawings and will be described herein in detail. It should be understood, however, that the drawings and detailed description are not intended to limit the invention to the particular form disclosed, but on the contrary, the intention is to cover all modifications, equivalents and alternatives falling within the spirit and scope of the present invention as defined by the appended claims.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

In the following detailed description of the preferred embodiments, reference is made to the accompanying drawings illustrating embodiments in which the invention may be practiced. It should be understood that other embodiments may be utilized and changes may be made without departing from the scope of the present invention.

Figure 4:
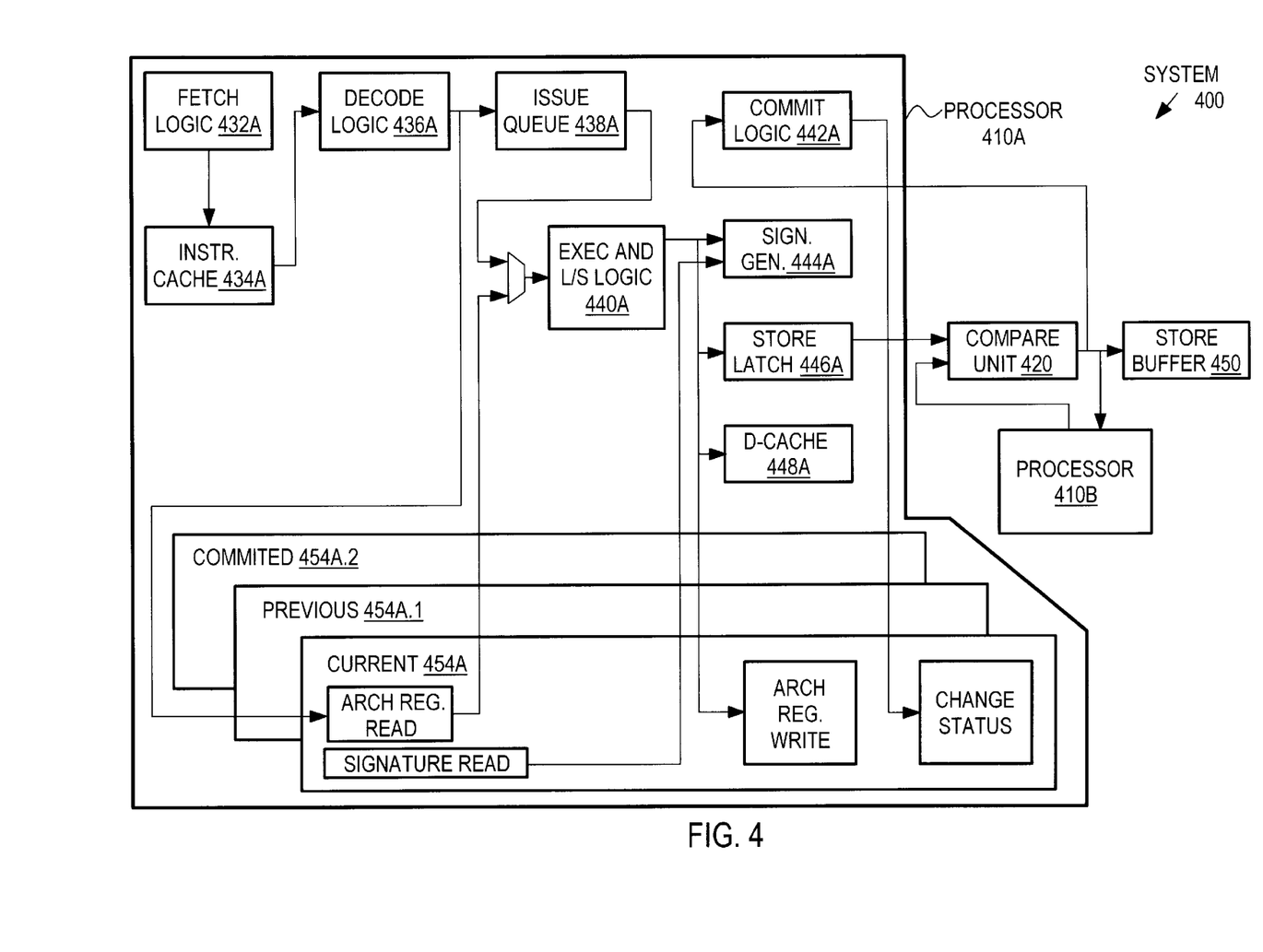
FIG. 4 illustrates processors according to an embodiment of the present invention.

Referring now to FIG. 4, a multiprocessing system 400 is shown according to an embodiment of the present invention. The system 400 includes a first processor 410A, a second processor 410B (which may or may not be identical to processor 410A), and compare unit 420. Processor 410A has the following elements connected to one another as shown: fetch logic 432A, instruction cache 434A, decode logic 436A, issue queue 438A, execution and load/store unit 440A, commit logic 442A, signature generator 444A, store latch 446A, data cache 448A and architected register 454A for holding a current result. Architected register 454A has a shadow register 454A.1 for holding a previous result, and shadow register 454A.2 for holding a committed result, as will be further explained. Processor 410B includes at least its own respective ones of the following elements (not shown): signature generator 444B, store latch 446B, and architected register 454B for holding a current result. Architected register 454B has shadow register 454B.1 for holding a previous result, and shadow register 454B.2 for holding a committed result.

It should be understood that while the FIG's and description herein focus on results stored in one exemplary register and its corresponding shadow registers, this is merely for the sake of illustration, and the processors actually include numerous such registers.

Figure 5:
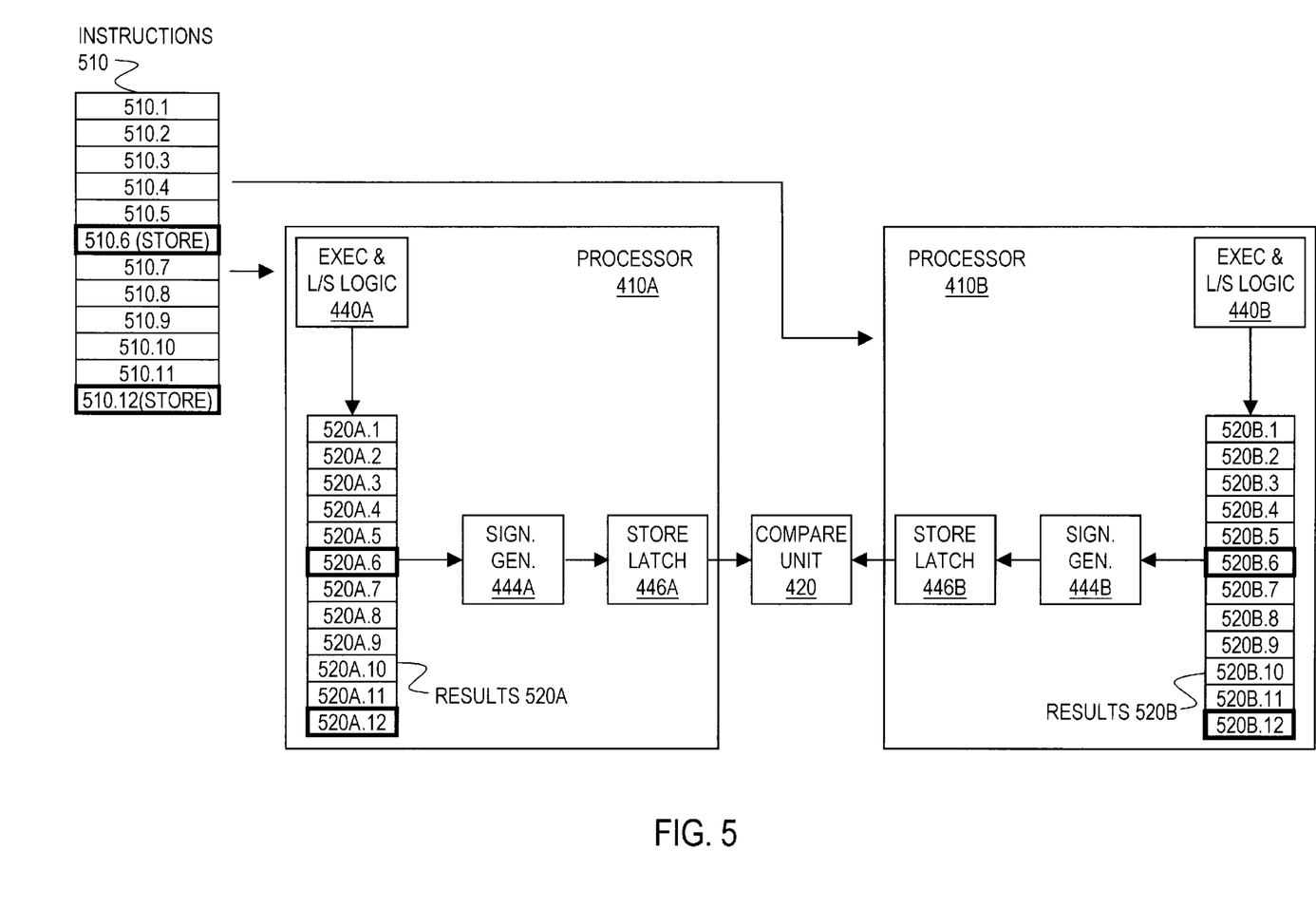
FIG. 5 illustrates an instruction stream and respective results computed by the processors of FIG. 4, according to an embodiment of the present invention.

Referring now to FIG. 5, The processors 410A and 410B are shown with a sequence of instructions 510 and respective results, to illustrate aspects of the present invention, according to an embodiment. The first processor 410A is operable to compute first results 520A responsive to the instructions 510, and the second processor 410B is operable to compute second results 520B responsive to the instructions 510. More specifically, the instructions 510 represent instructions for a program that are in a program sequence, including instruction 510.1, followed by 510.2, followed by 510.3, etc. For instruction 510.1 processor 410A computes result 520A.1 and processor 410B computes result 520B.1, whereas for instruction 510.2 processor 41 OA computes result 520A.2 and processor 41 OB computes result 520B.2, and so on. For each of the results signature generator 444A (FIG. 4) computes an updated signature, which it outputs to store latch 446A.

The compare unit 420 is operable to check at checkpoints for matching of the results. For example, according to the illustrated embodiment, instructions 510.6 and 510.12 are each instances of a store-type instruction that triggers a checkpoint. That is, responsive to computing a result 520A.6 for the instruction 510.6, for example, the signature generator 444A for processor 41 OA updates the signature stored in latch 446A, as it does for each of the results 520A.1, 520A.2, etc. Likewise, responsive to computing a result 520B.6 for the instruction 510.6, the signature generator 444B for processor 410B updates the signature stored in latch 446B, as it does for each of the results 520B.1, 520B.2, etc. In addition, since instruction 510.6 triggers a checkpoint, responsive to computing result 520A.6 the processor 410A indicates to compare unit 420 that the signature for result 520A.6 is ready. Likewise, responsive to computing result 520B.6 the processor 410B indicates to compare unit 420 that the signature for corresponding result 520B.6 is ready. Once the corresponding signatures are ready, compare unit 420 compares them to see if they match. It should be noted that the signatures reflect the store values themselves, or else the store values are compared to one another along with the signatures.

There are a variety of well-known compression schemes which may be employed for generating the signatures of the present invention. For example, a linear feedback shift register may be used, according to which a new input is XOR'ed with a bit that is shifted out. This is advantageous because the resulting signature traverses a space in a very random way so that it is unlikely to produce a small excursion from a state the signature is supposed to have and back. Signature generation as discussed in the related patent application is also relevant to the present invention.

Figure 3:
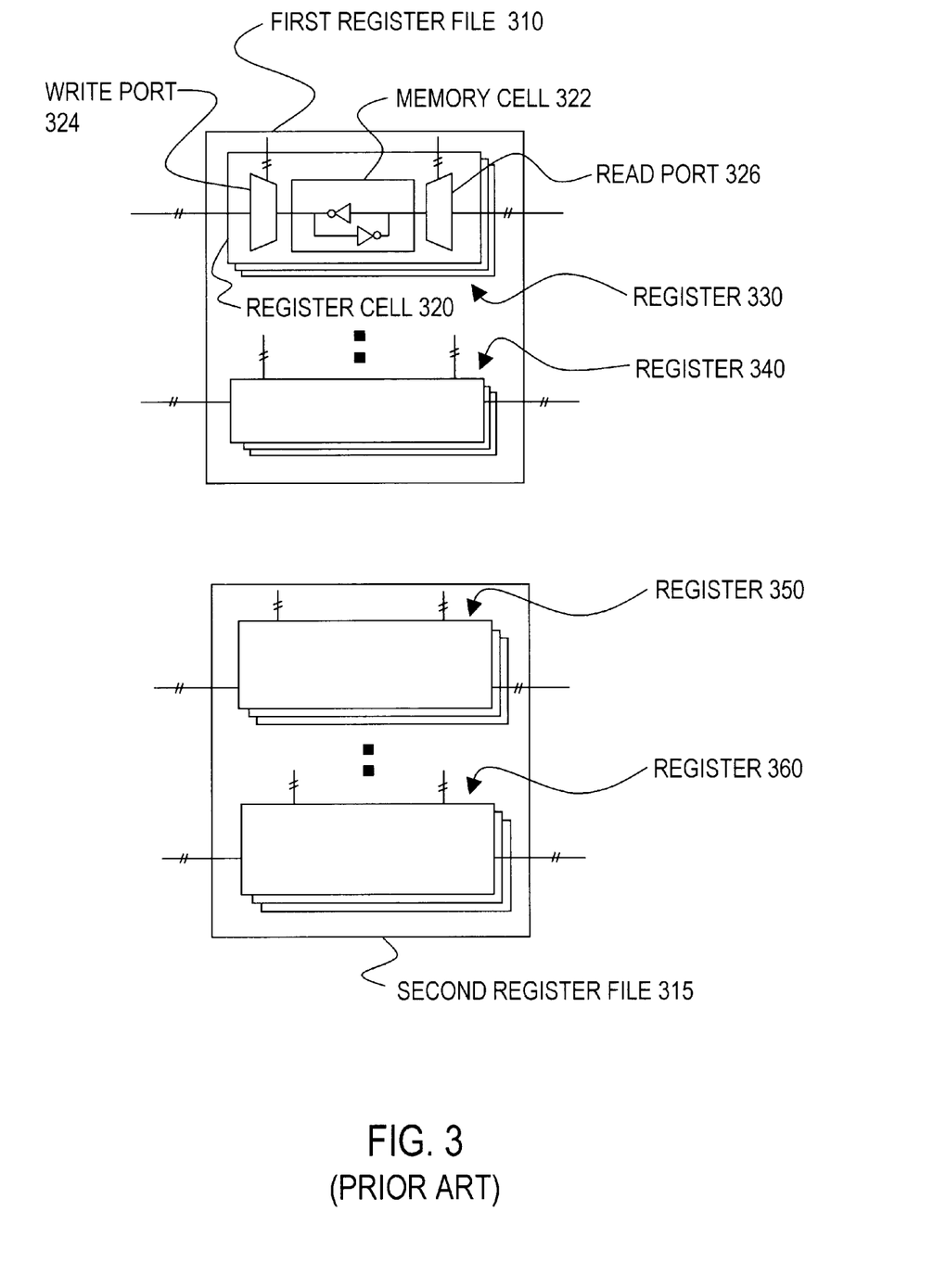
FIG. 3 illustrates prior art register files for a processor.

Referring now to FIG. 3, conventional register files 310 and 315 are illustrated for contrasting with aspects of an embodiment of the present invention. In the example, the first register file 310 and the second register file 315 are essentially identical. Register file 310 has a number of registers, including register 330 and 340 which are explicitly illustrated. Each one of the registers has a number of register cells. Details of register cell 320 of register 330 are explicitly illustrated. The exemplary register cell 320 includes a memory cell 322 coupled to an input (i.e., write) port 324 and an output (i.e., read) port 326.

Figure 6:
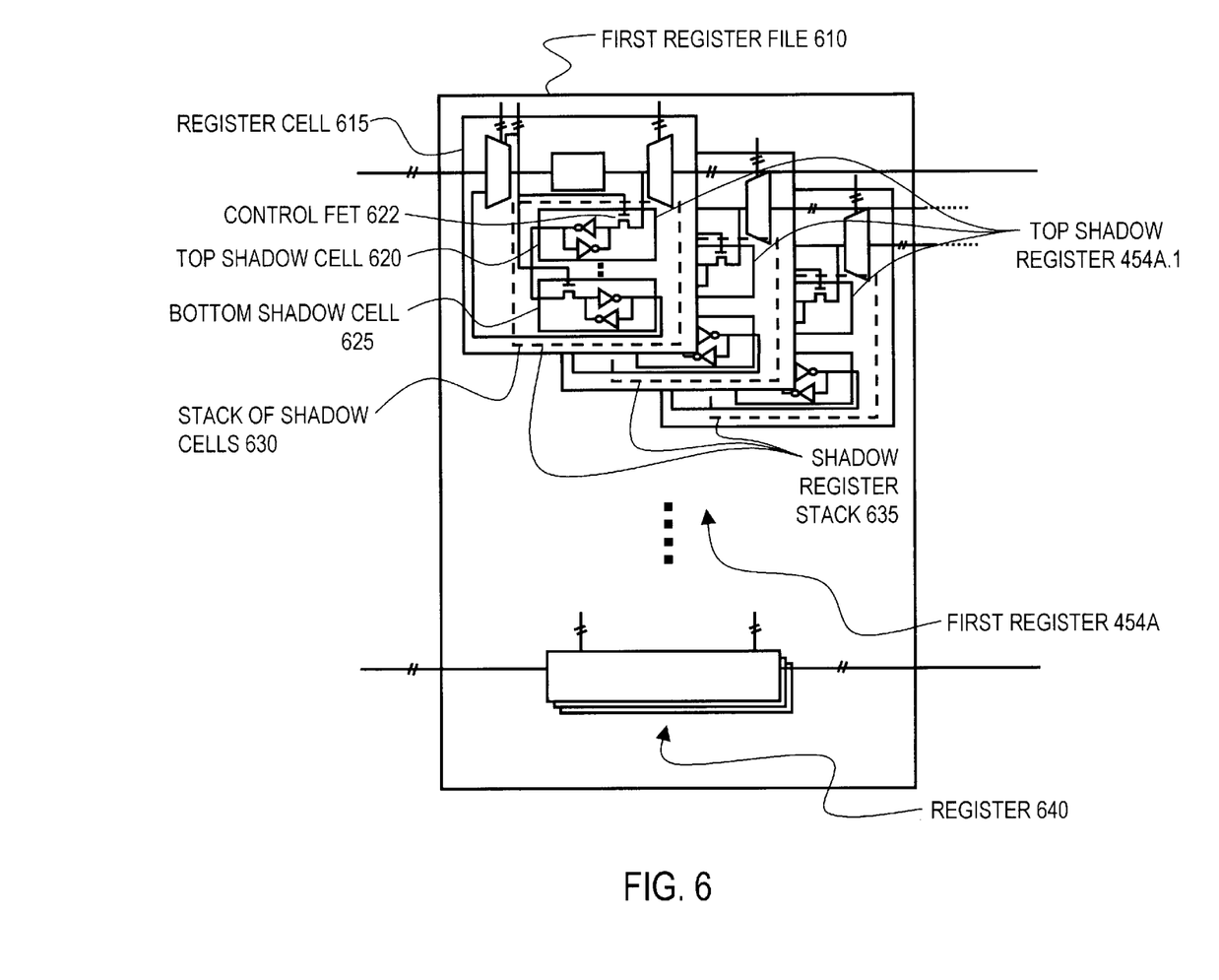
FIG. 6 illustrates a register file for the processors of FIG. 4, according to an embodiment of the present invention.

Referring now to FIG. 6, a register file 610 is illustrated, according to an embodiment of the present invention. The register file 610 shown is for processor 410A, but is representative of register files in both processors 41 OA and 41 OB, and includes a number of registers. Explicitly illustrated are registers 454A, as was shown in FIG. 4, and register 640. Other registers may also be included in the register file 610 as indicated by the ellipses between registers 454A and 640. Register 454A includes a number of register cells 615, each of which has a conventional memory cell, write port and read port as in conventional register cells, such as cells 320 in register 330 (FIG. 3). In contrast to conventional registers, the register cells 615 of register 454A FIG. 6), for example, have corresponding shadow cells arranged in stacks of shadow cells 630. Shadow cells shown explicitly for the shadow cell stack 630 of register cell 615 include the top shadow cell 620 and the last i.e., bottom shadow cell 625. There may be others therebetween as indicated by the ellipses between cell 620 and cell 625, or shadow cell 625 may be the very next one below cell 620. The top shadow cells 620 are connected to their respective register cells 615 by respective control FET's 622 as shown. The contents of the register cell 615 may be written into the shadow cell 620 under control of the control FET 622. Likewise, the contents of the shadow cell 620 may be written to the next shadow cell under control of the FET interconnecting the shadow cell 620 and the next shadow cell.

As may be seen in FIG. 6, the top shadow register 454A. 1 (also shown in FIG. 4) for register 454A includes the top shadow cells 620 of the register 454A register cells 615, and correspondingly the contents of the register 454A may be written to the top shadow register 454A.1, and the contents of the top shadow register 454A.1 may be written to the next shadow register under control of the respective FET's therebetween.

According to this arrangement, register 454A holds one of the processor 41 OA current results. The register 454A includes a stack 635 of shadow registers, the stack 635 has at least a top shadow register 454A. 1 and a next shadow register, which may be the last, i.e., bottom shadow register (i.e., shadow register 454A.2 in FIG. 4) that includes bottom shadow cells 625 (FIG. 6). The processor 410A is operable to perform shifting of the results, including shifting a current one of the processor's results from the first register 454A into the top shadow register 454A. 1, so that an earlier one of the processor's results can be restored from one of the shadow registers to the first register 454A responsive to the compare unit 420 determining that the first and second results mismatch.

Referring again to FIG. 5, as stated above, for each of the results 520A. 1, 520A.2, et. signature generator 444A (FIG. 4) computes an updated signature, which it outputs to store latch 446A. Likewise, for each of the results 520B.1, 520B.2, et. signature generator 444B (FIG. 4) computes an updated signature, which it outputs to store latch 446B. According to another aspect, the signature generator 444A for the first processor 41 OA and the signature generator 444B for the second processor 41 OB are each operable to compute respective cumulative signatures for the sequences of the processors' results 520A and 520B. That is, in the illustrated sequence of instructions 510 (and corresponding sequence of results 520A and 520B) it is implied that a checkpoint (not shown) immediately precedes the sequence of instructions 510 so that the sequence 510 begins after the checkpoint. Furthermore, the sequence 510 includes a sequence of instructions beginning with instruction 510.1 and ending with a checkpoint responsive to the aforementioned store instruction 510.6, after which a next sequence begins with instruction 510.7. For the sequence of instructions 510.1 through 510.6, and corresponding results 520A. 1 through 520A.6, for example, the processor 410A is operable to initialize a new signature for the first result 520A. 1, and then update the signature, which is stored in the signature storage unit, i.e., store latch 446A, in such a manner that the updated signature reflects the cumulative effect of the sequence of instructions 510.1 through 510.6 and corresponding results. Likewise the same is true for processor 410B and its respective results and signatures.

According to one embodiment, the processors update their signatures in the following manner. For each instruction that alters the value in a register, processor 41 OA, for example, sends to its signature generator 444A new information, including altered values and the identities of registers holding those values. The signature generator 444A merges the new information with the already existing signature in the store latch 446A to form an updated signature. Then, responsive to a checkpoint, such as store instruction 510.6, the store latch 446A sends the store value for storage in a cache and/or main store. The store latch 446A includes the cumulative signature with the store value. Meanwhile, processor 410B has done the same, and the compare unit 420 compares the cumulative signatures from the respective store latches 446A and 446B. If the signatures match this tends to indicate that the results 520A. 1 through 520B.6 and results 520B. 1 through 520B.6 were the same. If the signatures do not match, then the store result is not forwarded to the store buffer 450. Instead the compare unit 420 resets the processors to the state they had for their last matching checkpoint, and initiates refetching of instructions and flushing of local caches 448A and 448B so that the processor can resume execution at that point.

For processors 410A and 410B operating as a pair-wise system, the processors share one store buffer 450 as shown in FIG. 4. Alternatively, the processors coordinate ones of their own respective store buffers (not shown) to function as the unified store buffer 450. When the processor's operate independently they each use ones of their own respective store buffers.

It has been pointed out that the instructions 510 have a certain program sequence, and that result 520A.1 is for corresponding instruction 510.1, result 520A.2 is for instruction 510.2, etc. As implied by the corresponding sequence of results 520A and 520B, for the embodiment illustrated in FIG. 5, the second processor 41 OB executes the instructions 510 in the identical sequence in which the first processor executes the instructions 510. It has also been stated above that checkpoints are responsive to store-type instructions, according to an embodiment. It should be understood that for an embodiment where the processors execute the instructions in identical sequences, the checkpoints may alternatively or additionally be responsive to an accumulated number of execution cycles. According to one embodiment checkpoints are triggered for every store-type instruction result and also for every tenth instruction result if the ten instruction results after a certain store instruction do not include a result for another store instruction.

In an alternative embodiment, one or both of the processors 410A and 410B may have an architecture which permits execution of the instructions in a sequence different than the program sequence. Therefore, the results 520A and 520B may be produced in a different sequence than what is illustrated in FIG. 5. Consequently, in order to have a common basis for comparison of the respective results, according to an embodiment of the present invention both of the processors are constrained to execute store-type instructions according to a sequence in which the store-type instructions occur in the certain instruction sequence. For example, in FIG. 5 instructions 510.6 and 510.12 are store-type instructions, and while according to this embodiment the processors 410A and 410B may execute instructions 510.1 through 510.6 out of sequence and instructions 510.7 through 510.12 out of sequence, results for instruction 510.6 must be computed before results for any of the instructions 510.7 through 510.12. Furthermore, processor state must also be updated in sequence, even though execution may be out of order, and only registers being committed at a given time participate in updating the signature. Moreover, for out of order execution the architected registers are supplemented with a future file (a.k.a. rename registers) or a history file, depending on architecture. Accordingly, register 454A is a rename register in the future file architecture, or an architected register in the history file architecture.

In this manner, since the first sequence of results 520A. 1 through 520A.6 (not necessarily in that order) ends with a result for the store instruction 510.6 and the second sequence of results 520B.1 through 520B.6 (not necessarily in that order) both end with respective results for the same store instruction 510.6, even though the results may differ in sequence in some respects, the cumulative effect of the first sequence of results and the second sequence of results will be the same upon computing the respective results for the store instruction 510.6, for example, unless one of the processors has malfunctioned. That is, it is advantageous to trigger checkpoints responsive to store-type instructions so that while an intermediate one of the results of the first sequence of results may be different than a corresponding intermediate one of the results of the second sequence of results, nevertheless the first processor's ending result for the first sequence and the second processor's ending result for the second sequence tend to match unless one of the processors has malfunctioned.

The preceding has concerned checkpoint issues arising from sequence of execution of instructions. Another issue that must be handled concerns stalling. That is, in order to preserve throughput rates a method and structure must be provided so that the processors are able to at least begin executing a next sequence of instructions before checking of signatures is completed for a previous sequence. Otherwise, the processors would have to stall while waiting for checking to complete.

In the embodiment of FIG. 4, the register 454A is labeled "current," and has a shadow register stack with a top shadow register 454A. I labeled "previous" and a next, i.e., bottom shadow register 454A.2 labeled "committed." The "current" register 454A is for a current result, i.e., it has a value currently being read from or written into. The processor 41 0A needs to be able to continue to execute instructions while it compares its signature with that of the other processor 410B for a sequence of instructions immediately preceding the sequence from which the current result arises. In order to continue, the processor 410A needs to use the "current" register 454A, and therefore "previous" shadow register 454A. 1 is provided for temporarily holding a result from that immediately preceding sequence. Once the comparison is completed, if the signatures match this tends to indicate that the result in the "previous" shadow register 454A. 1 is good, and the result may therefore be committed. On the other hand if the signatures do not match, the processor 410A needs to be able to recover to an earlier state which is a known good state, i.e., a committed state. The "committed" shadow register 454A.2 is therefore provided for holding a committed result, i.e., a result from register 454A that may have been computed even earlier than the result in shadow register 454A. 1.

Figure 7:
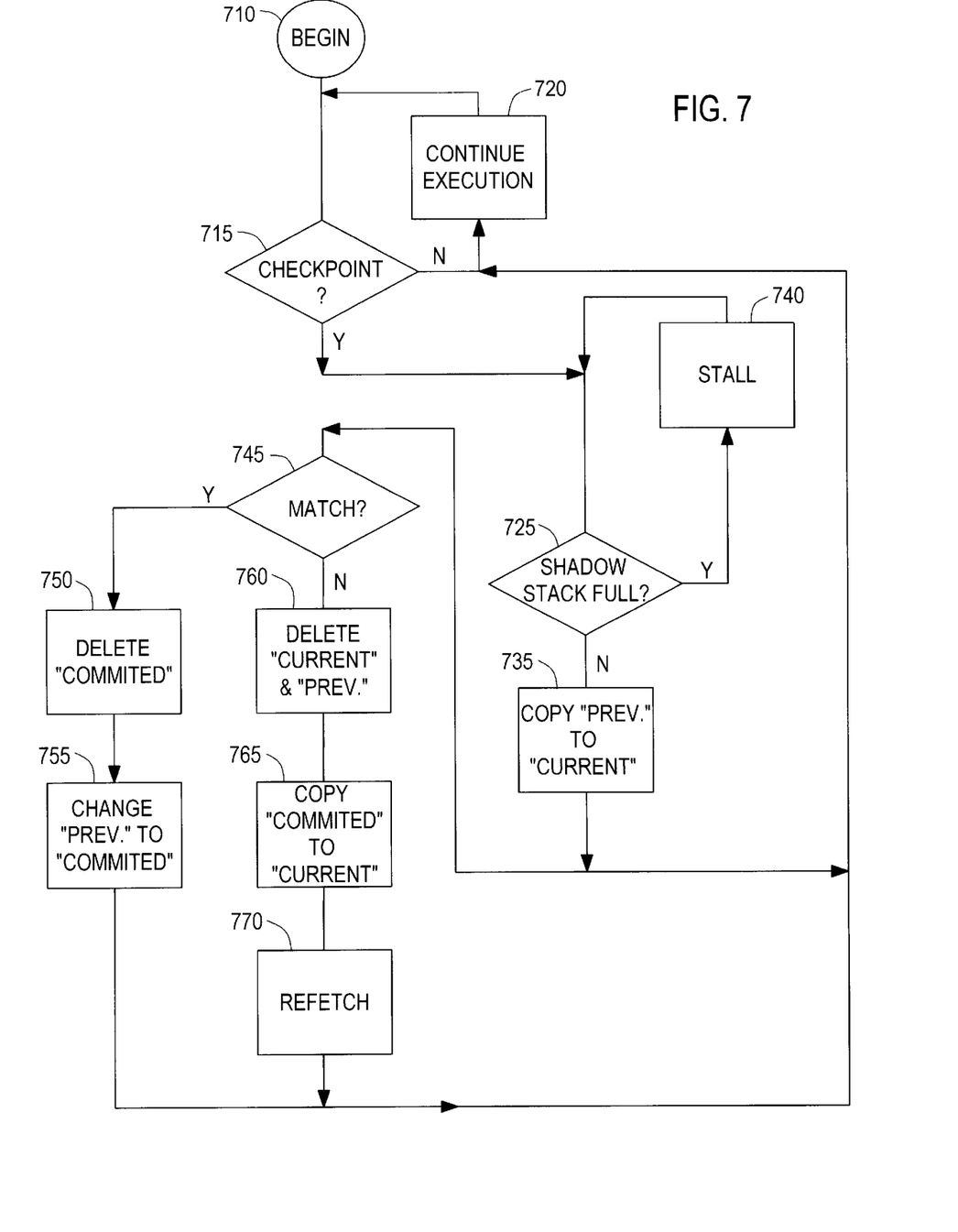
FIG. 7, illustrates method steps for handling registers for the processors of FIG. 4, according to an embodiment of the present invention.

Referring now to FIG. 7, method steps relating to the handling of the registers are illustrated according to an embodiment. The processor begins execution at 710, and checks for a checkpoint at 715. If the instruction does not trigger a checkpoint, the processor continues executing at 720.

When the processor does encounter a checkpoint at 715 the processor needs to check the signature at 745 for the sequence of instructions ending at the checkpoint triggering instruction to see if it matches the corresponding signature from the other processor. The processor also needs to continue executing at 720 if resources permit, so the processor checks to see if the processor's stack of shadow registers is full at 725. If the stack is full, the processor stalls at 740 until a shadow register is cleared.

Certainly for the first checkpoint the shadow stack will not be full, and at step 735 the processor, processor 410A (FIG. 4) for example, copies, i.e., shifts, its result in the architected register 454A (also referred to as "current" register in FIG. 4) to the "previous" shadow register 454A. 1 to free up the architected register 454A to continue executing instructions at 720. In this manner the processor can at least begin executing a next instruction at 720 before comparing at 745 can be completed for the signature that reflects the result of the sequence of instructions that ended in the checkpoint triggering instruction.

Meanwhile, one of the shadow registers, register 454A. 1 or 454A.2 (FIG. 4) for example, will be cleared subsequent to comparing the signature of the processor 41 OA with that of processor 410B at 745 as follows. If the signatures match, this indicates the results for the signatures currently being compared may be committed, so the "committed" register 454A.2 is cleared, i.e., "deleted," at 750 to make room for the result associated with the subject signature, the result in "previous" register 454A. 1 is moved to the "committed" registers at 755, and execution continues at 720. (It should be understood that in an alternative embodiment the results may not be actually moved from the "previous" register to the "committed" register, but rather the function of the registers may just be reassigned. That is, the "committed" register may be marked invalid, and the "previous" register may be now deemed to be the "committed" register.)

If the signatures do not match, then the "current" and "previous" registers are cleared or marked invalid, i.e., "deleted," at 760, since the processor needs to be reset to the committed state associated with the checkpoint immediately preceding the instruction sequence for the signatures currently being compared. The results in the "committed" shadow register 454A.2 is then copied to its architected register 454A at 765, the cache 448A is flushed and instructions are refetched at 770, and execution continues at 720.

It should be understood that as a result of one or the other of the above logical paths subsequent to the comparing in step 745, one of the shadow registers has been cleared, so that if the processor had to stall at 740 due to the shadow stack being full, this condition has been remedied.

Those of ordinary skill in the art will appreciate that the hardware particularly in FIG. 4, but also in the other FIG's may vary depending on the implementation. For example, the number of registers in the shadow register stack may be increased so that there may be more than one signature compare operation pending. The depicted example is not meant to imply architectural limitations with respect to the present invention.

It should be understood from the foregoing, that it is a particular advantage of the invention that it permits operating processors in the high reliability mode described hereinabove, wherein results are checked at checkpoints, or the processors may be operated independently. It is also an advantage that the processors that check each other in the high reliability mode may differ in many aspects and yet still remain compatible to the demands of the high reliability processing mode. For example, one processor may be a more complicated processor that executes instructions out of sequence while the other is a more simple processor that executes instructions in order. It is also an advantage that the processors do not have to operate at the same speed. Their results may merely be checked at checkpoints while the processors continue executing.

The description of the present embodiment has been presented for purposes of illustration, but is not intended to be exhaustive or to limit the invention to the form disclosed. Many modifications and variations will be apparent to those of ordinary skill in the art. It should be noted that store-type instructions are selected for triggering checkpoints to eliminate the hazard of a malfunctioning processor computing an erroneous result and changing the state of external memory subsystem. That is, by checking for proper functioning before committing a result to the external memory responsive to a store-type instruction, the hazard is reduced. It should be understood that it would be within the spirit and scope of the invention to encompass an embodiment wherein checkpoints are triggered responsive to other types of instructions.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention.

What is claimed is:

1. A method for multiprocessing comprising the steps of:
    a) computing results by a first processor responsive to instructions having a certain instruction sequence, wherein the processor has first register for storing one of the processor's results, and wherein the first register is associated with a first stack of shadow registers with at least a top shadow register and a next shadow register;
    b) computing results by a second processor responsive to the instructions, wherein the second processor has a second resister for storing one of the second processor's results, and wherein the second register is associated with a second stack of shadow registers with at least a top shadow register and a next shadow register, wherein the first and second processors compute first and second results and store the results in the first and second registers, respectively;
    c) shifting the first result from the first register into the first register's top shadow register responsive to a checkpoint, wherein the first result that is shifted into the first register's top shadow register is for a first sequence ending instruction at the end of a first sequence of the instructions;
    d) shifting the second result from the second register into the second register's top shadow register responsive to the checkpoint, wherein the second result that is shifted into the second reaister's ton shadow register is for a second sequence ending instruction at the end of a second sequence of the instructions, the first and second sequence ending instructions being a same one instruction wherein the checkpoint arises in correspondence with the first and second sequence ending instructions;
    e) checking for matching of cumulative results for the first sequence of the instructions and the second second sequence of the instructions, wherein the checking is responsive to the checkpoint, wherein the first and second results are shifted to the next shadow registers of the respective first and second registers responsive to a match indication from the checking; and
    f) computing respective results by the first and second processors for at least one of the instructions subsequent to the sequence ending instruction, wherein the shifting of the results permits the computing of step f) to proceed concurrently with the checking in step e).

2. The method of claim 1, comprising the step of:
    computing a first cumulative signature for the first sequence of instructions; and
    computing a second cumulative signature for the second sequence of instructions, and wherein step e) comprises comparing the first and second cumulative signatures.

3. The method of claim 2, wherein at least one of the processors may execute instructions in a sequence different than the instruction sequence, and wherein the checkpoints are responsive to store instructions, the method comprising the step of:
    executing store-type instructions by both processors in a same sequence in which the store-type instructions occur in the certain instruction sequence.

4. The method of claim 3, wherein computing the first cumulative signature comprises computing for the first processor's store instruction result, and wherein computing the second cumulative signature comprises computing for the second processor's store instruction result.

5. The method of claim 3, wherein step e) comprises comparing the first processor's result and the second processor's result for the store instruction.

6. The method of claim 2, wherein the second processor executes the instructions in a sequence identical to a sequence in which the first processor executes the instructions, and the checkpoints are responsive to accumulated number of execution cycles.

7. The method of claim 6, wherein the checkpoints are responsive to store instructions.

8. The method of claim 2, wherein the checkpoints are responsive to store instructions and to an accumulated number of execution cycles if there has been no store instruction since a last checkpoint.

9. The method of claim 1, wherein the method comprises the step of:
   shifting the results from ones of the shadow registers back into the first and second registers, respectively, in response to a mismatch indication from the checking of step e).

10. A multiprocessing system comprising:
    a first processor;
    a second processor; and
    compare logic, wherein the processors are operable to compute first and second results, respectively, in response to instructions having a certain instruction sequence, including the first processor computing results responsive to a first sequence of the instructions, and the second processor computing results responsive to a second sequence of the instructions, wherein such a first and second sequence end in respective sequence ending instructions, the sequence ending instructions being a same one of the instructions for both sequences, wherein a checkpoint arises in correspondence with the first and second sequence ending instructions, and wherein the compare logic is operable to check, in response to the checkpoint, for matching of cumulative the results of the first and second sequences of instructions;
    and wherein each processor comprises:
       a first register for storing the processor's results, wherein the register is associated with shadow registers with at least a top shadow register and a next shadow register, wherein the processors are operable to perform shifting of the results, including shifting the first and second results from the first registers into the respective top shadow registers of the stacks responsive to the checkpoint and shifting the first and second results to the next shadow registers of the respective first and second registers responsive to a match indication from the checking, and the processors are operable to compute respective results for at least one of the instructions subsequent to the sequence ending instruction, wherein the shifting of the results permits the computing for the at least one subsequent instruction to proceed concurrently with the checking.

11. The apparatus of claim 10, wherein the shifting that the processors are operable to perform includes shifting the results from ones of the shadow registers back into the first and second registers, respectively, in response to a mismatch indication from the checking.

12. The system of claim 10, wherein each processor comprises:
    a signature generator; and
    a signature storage unit, wherein the signature generator and storage units are operable to cooperatively compute a cumulative signature for the processor's respective sequence of instructions, and the processor is operable to store the cumulative signature in the signature storage unit pending the determining by the compare logic, and wherein the checking for matching of the results includes the compare logic comparing the cumulative signatures of each respective processor.

13. The system of claim 12, wherein at least one of the processors may execute instructions in a sequence different than the instruction sequence, but both of the processors execute store-type instructions in a same sequence in which the store-type instructions occur in the certain instruction sequence.

14. The system of claim 13, wherein the cumulative signature for the first processor's sequence of results includes a result for one of the store instructions, and wherein the cumulative signature for the second processor's sequence of results includes a result for the same one of the stare instructions.

15. The system of claim 13, wherein the checking for matching of the results includes comparing the first processor's result and the second processor's result for the store instruction.

16. The system of claim 12, wherein the second processor executes the instructions in a sequence identical to a sequence in which the first processor executes the instructions, and the checkpoints are responsive to accumulated number of execution cycles.

17. The system of claim 16, wherein the checkpoints are responsive to store instructions.

18. The system of claim 12, wherein the checkpoints are responsive to store instructions and to an accumulated number of execution cycles if there has been no store instruction since a last checkpoint.

* * * * *

UNITED STATES PATENT AND TRADEMARK OFFICE
CERTIFICATE OF CORRECTION

PATENT NO. : 6,751,749 B2
DATED : June 15, 2004
INVENTOR(S) : Hofstee et al.

It is certified that error appears in the above-identified patent and that said Letters Patent is hereby corrected as shown below:

Column 9,
Line 60, after "processor has" please insert -- a --;

Column 10,
Line 15, please replace "reaister's ton" with -- register's top --;
Line 18, please replace "same one instruction" with -- same one of the instructions --;

Column 11,
Line 25, please delete the first occurance of "the";
Line 29, after "with" please insert -- a stack of --.

Signed and Sealed this

Third Day of May, 2005

JON W. DUDAS
*Director of the United States Patent and Trademark Office*